United States Patent [19]

Yanagisawa

[11] Patent Number: 5,311,791
[45] Date of Patent: May 17, 1994

[54] TWO DIMENTIONAL DRIVE SYSTEM

[76] Inventor: Ken Yanagisawa, c/o Kabushiki Kaisha Mechanic Sekkei Jimusho, 5175-1, Ooaza, Toyoshina, Toyoshina-machi, Minamiazumi-gun, Nagano-ken, Japan

[21] Appl. No.: 921,732

[22] Filed: Jul. 30, 1992

[30] Foreign Application Priority Data

Aug. 7, 1991 [JP] Japan .................. 3-222274

[51] Int. Cl.$^5$ .................. G05G 11/00; F16H 27/02
[52] U.S. Cl. .................. 74/479 PH; 74/89.15; 74/89.17; 74/89.22; 108/143; 248/656; 248/913
[58] Field of Search ........ 74/479 R, 479 BP, 479 PH, 74/479 PP, 89.15, 89.17, 89.2, 89.22; 33/1 M; 108/143, 20, 137; 248/656, 657, 913, 661, 178, 184; 269/73, 71; 414/749; 359/393

[56] References Cited

U.S. PATENT DOCUMENTS

| | | | |
|---|---|---|---|
| 2,941,136 | 6/1960 | Marantette et al. | 33/1 M |
| 3,495,519 | 2/1970 | Alfsen et al. | 33/1 M |
| 4,628,756 | 12/1986 | Kimura et al. | 74/479 |
| 4,995,277 | 2/1991 | Yanagisawa | 74/479 X |

FOREIGN PATENT DOCUMENTS 59-232778 12/1984 Japan .

*Primary Examiner*—Leslie A. Braun
*Assistant Examiner*—David W. Laub

[57] ABSTRACT

An object of the present invention is to provide a two dimensional drive system having higher positioning accuracy. The drive system includes a pair of first linear guides provided in a first direction; a pair of second linear guides provided in a second direction; a pair of first travellers slidably engaged with the first linear guides; a pair of second travellers slidably engaged with the second linear guides; a first ball bearing screw rotatably spanned between the second travellers; a second ball bearing screw rotatably spanned between the first travellers; a slider screwed with the first and the second ball bearing screws, the slider being capable of moving on the ball bearing screws; a first and a second motors for driving each ball bearing screw; a first restrainer for restraining the inclination of the first ball bearing screw with respect to the first direction; and a second restrainer for restraining the inclination of the second ball bearing screw with respect to the second direction.

7 Claims, 2 Drawing Sheets

TWO DIMENTIONAL DRIVE SYSTEM

BACKGROUND OF THE INVENTION

The present invention relates to a two dimensional drive system, more precisely relates to a two dimensional drive system which is capable of moving a slider in a plane.

There is disclosed a conventional drive system, which is capable of moving a slider in a plane, in Japanese Patent Kokai Gazette No. 59-232778. The drive system has a pair of X-axis guides provided in an X-direction; a pair of Y-axis guides provided in a Y-direction perpendicular to the X-direction; a pair of X-travellers slidably engaged with each X-travellers; a pair of Y-travellers slidably engaged with each Y-travellers; an X-ball bearing screw rotatably spanned between the Y-travellers; a Y-ball bearing screw rotatably spanned between the X-travellers; a slider to which the X- and Y-ball bearing screws are screwed whereby the slider is capable of moving on the X- and Y-ball bearing screws with the rotation thereof; and motors for driving the X- and Y-ball bearing screws.

However, the conventional two dimensional drive system has a following disadvantages:

The X- and Y-travellers are merely slidably engaged with the X- and Y-guides. Therefore, when the slider, which is close to one of the X-travellers, moves in the X-direction, the other X-traveller moves later than the one thereof, so that the Y-ball bearing screw is inclined with respect to the Y-axis; when the slider, which is close to one of the Y-travellers, moves in the Y-direction, the other Y-traveller moves later than the one thereof, so that the X-ball bearing screw is inclined with respect to the X-axis. By inclination of the X- and Y-ball bearing screws, the positioning accuracy of the slider may be quite low, and the vibration of the slider may be caused during high speed operation.

SUMMARY OF THE INVENTION

An object of the present invention is to provide a two dimensional drive system in which positioning accuracy of a slider is quite high and vibration can be prevented during high speed operation.

To achieve the object the drive system comprises:

a pair of first linear guides provided in a first direction;

a pair of second linear guides provided in a second direction perpendicular to the first direction;

a pair of first travellers respectively engaged with the first linear guides, the first travellers being capable of moving in the first direction along the first linear guides;

a pair of second travellers respectively engaged with the second linear guides, the second travellers being capable of moving in the second direction along the second linear guides;

a first ball bearing screw being provided in the first direction, the first ball bearing screw being rotatably spanned between the second travellers;

a second ball bearing screw being provided in the second direction, the second ball bearing screw being rotatably spanned between the first travellers;

a slider being screwed with the first ball bearing screw and the second ball bearing screw, the slider being capable of moving in the first direction and the second direction on the first ball bearing screw and the second ball bearing screw with rotation thereof;

a first motor for driving the first ball bearing screw, the first motor being provided on one of the second travellers;

a second motor for driving the second ball bearing screw, the second motor being provided on one of the first travellers;

first restraining means for restraining the inclination of the first ball bearing screw with respect to the first direction; and second restraining means for restraining the inclination of the second ball bearing screw with respect to the second direction.

With these structures, the inclination of the first and the second ball bearing screws with respect to the first and the second directions can be prevented by the first and the second restraining means, so that the first and the second ball bearing screws always securely maintain their directions to the first and the second directions, and the positioning accuracy of the slider can be higher. Additionally, by preventing the inclination of the first and the second ball bearing screws, the vibration of the slider can be prevented during high speed operation.

BRIEF DESCRIPTION OF THE DRAWINGS

Embodiments of the present invention will now be described by way of examples and with reference to the accompanying drawings, in which.

DETAILED DESCRIPTION OF PREFERRED EMBODIMENTS

Preferred embodiments of the present invention will now be described in detail with reference to the accompanying drawings.

Figure 1:
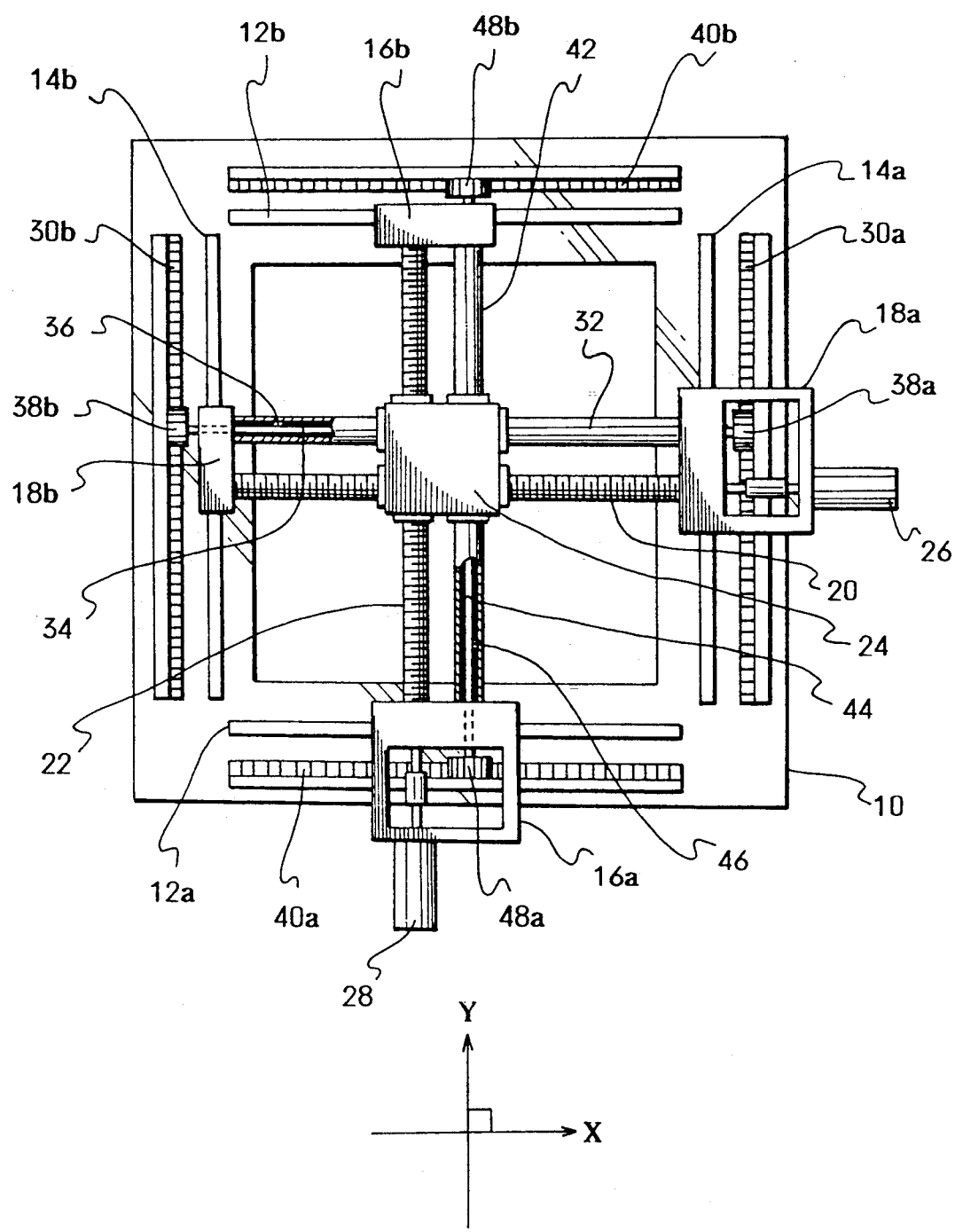
FIG. 1 is a plan view of a drive system of a First Embodiment.

First Embodiment will be described with reference to FIG. 1.

A base 10 is formed like a frame whose center section is a hollow section.

First linear guides 12a, 12b are fixed on the base 10. The first linear guides 12a, 12b are provided in parallel in an X-direction (a first direction).

Second linear guides 14a, 14b are also fixed on the base 10. The second linear guides 14a, 14b are provided in parallel in a Y-direction (a second direction) perpendicular to the X-direction.

Bottom sections of first travellers 16a, 16b are respectively engaged with each first linear guides 12a, 12b. Each first traveller 16a, 16b is capable of moving in the X-direction along each first linear guide 12a, 12b.

Bottom sections of second travellers 18a, 18b are respectively engaged with each second linear guides 14a, 14b. Each second traveller 18a, 18b is capable of moving in the Y-direction along each second linear guide 14a, 14b.

A first ball bearing screw 20 is provided in the X-direction. The first ball bearing screw 20 is spanned between the second travellers 18a, 18b. The first ball bearing screw 20 is capable of turning on its axis.

A second ball bearing screw 22 is provided in the Y-direction. The second ball bearing screw 22 is spanned between the first travellers 16a, 16b. The second ball bearing screw 22 is capable of turning on its axis.

The first ball bearing screw 20 and the second ball bearing screw 22 are screwed through a slider 24 to which tools, works, etc. (not shown) can be attached. The slider 24 is capable of moving on the first ball bearing screw 20 and the second ball bearing screw 22 in the X- and Y-directions when the ball bearing screws 20, 22 turn on their axes.

A first servo motor 26 is fixed on the second traveller 18a. The first ball bearing screw 20 is turned on its axis by the first motor 26.

A second servo motor 28 is fixed on the first traveller 16a. The second ball bearing screw 22 is turned on its axis by the second motor 28.

First racks 30a, 30b are fixed on the base 10. The first racks 30a, 30b are provided in parallel to the second linear guides 14a, 14b.

A first pipe 32 is provided in the X-direction. The first pipe 32 is pierced through the slider 24 and in parallel to the first ball bearing screw 20. Both ends of the first pipe 32 are respectively fixed at the second travellers 18a, 18b. When the slider 24 is moved in the X-direction by turning the first ball bearing screw 20, the slider 24 slides on the first pipe 32.

A first shaft 34 is provided in the X-direction. The first shaft 34 is pierced through the first pipe 32, and the second travellers 18a, 18b. The first shaft 34 is capable of turning on its axis. Note that, the first pipe 32 is filled with lubricant 36, e.g. grease, to prevent abrasion and noise in the first pipe 32.

First pinions 38a, 38b are respectively fixed at each end of the first shaft 34. First pinions 38a, 38b are respectively engaged with each first rack 30a, 30b.

The first racks 30a, 30b, the first shaft 34, the first pinions 38a, 38b, etc. constitute first restraining means. By the first restraining means, even if the first ball bearing screw 20 is about to incline with respect to the X-axis when the second traveller 18b moves later than the second traveller 18a, the delay of the second traveller 18b is compulsorily eliminated by the torsion in the first shaft 34, which occurs by the engagement of the first racks 30a, 30b, and the first pinions 38a, 38b. Thus, positioning error of the slider 24 with respect to the X-direction, vibration during high speed operation, etc., which are caused by the inclination of the first ball bearing screw 20, can be prevented.

Second racks 40a, 40b are fixed on the base 10. The second racks 40a, 40b are provided in parallel to the first linear guides 12a, 12b.

A second pipe 42 is provided in the Y-direction. The second pipe 42 is pierced through the slider 24 and in parallel to the second ball bearing screw 22. Both ends of the second pipe 42 are respectively fixed at the first travellers 16a, 16b. When the slider 24 is moved in the Y-direction by turning the second ball bearing screw 22, the slider 24 slides on the second pipe 42.

A second shaft 44 is provided in the Y-direction. The second shaft 44 is pierced through the second pipe 42, and the first travellers 16a, 16b. The second shaft 44 is capable of turning on its axis. Note that, the second pipe 42 is filled with lubricant 46, e.g. grease, to prevent abrasion and noise in the second pipe 42.

Second pinions 48a, 48b are respectively fixed at each end of the second shaft 44. Second pinions 48a, 48b are respectively engaged with each second rack 40a, 40b.

The second racks 40a, 40b, the second shaft 44, the second pinions 48a, 48b, etc. constitute second restraining means. By the second restraining means, even if the second ball bearing screw 22 is about to incline with respect to the Y-axis when the first traveller 16b moves later than the first traveller 16a, the delay of the first traveller 16b is compulsorily eliminated by the torsion in the second shaft 44, which occurs by the engagement of the second racks 40a, 40b, and the second pinions 48a, 48b. Thus, positioning error of the slider 24 with respect to the Y-direction, vibration during high speed operation, etc., which are caused by the inclination of the second ball bearing screw 22, can be prevented.

Figure 2:
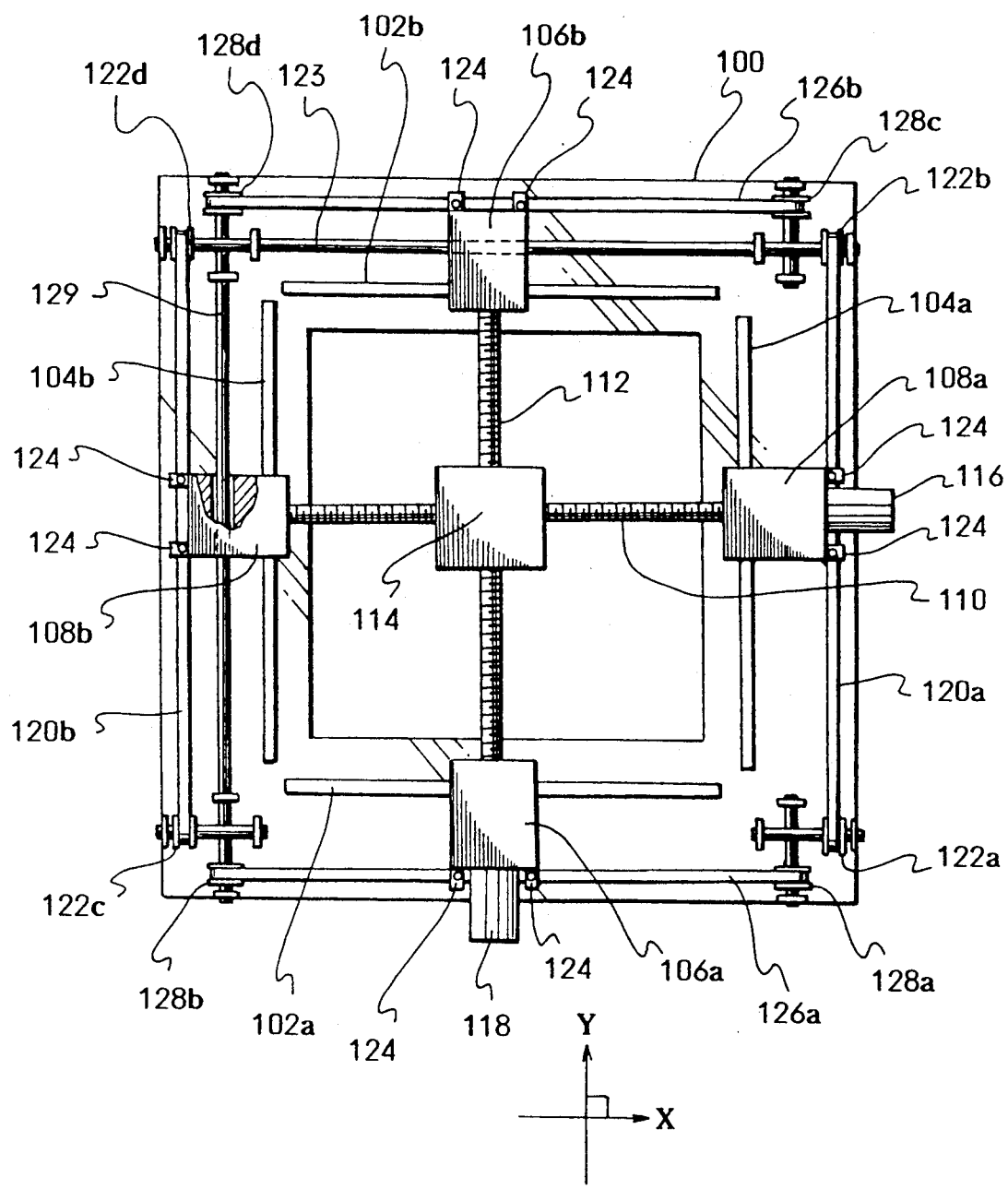
FIG. 2 is a plan view of a drive system of a Second Embodiment.

Second Embodiment will be described with reference to FIG. 2.

A base 100 is formed like a frame whose center section is a hollow section.

First linear guides 102a, 102b are fixed on the base 100. The first linear guides 102a, 102b are provided in parallel in an X-direction (a first direction).

Second linear guides 104a, 104b are also fixed on the base 100. The second linear guides 104a, 104b are provided in parallel in a Y-direction (a second direction) perpendicular to the X-direction.

Bottom sections of first travellers 106a, 106b are respectively engaged with each first linear guides 102a, 102b. Each first traveller 106a, 106b is capable of moving in the X-direction along each first linear guide 102a, 102b.

Bottom sections of second travellers 108a, 108b are respectively engaged with each second linear guides 104a, 104b. Each second traveller 108a, 108b is capable of moving in the Y-direction along each second linear guide 104a, 104b.

A first ball bearing screw 110 is provided in the X-direction. The first ball bearing screw 110 is spanned between the second travellers 108a, 108b. The first ball bearing screw 110 is capable of turning on its axis.

A second ball bearing screw 112 is provided in the Y-direction. The second ball bearing screw 112 is rotatably spanned between the first travellers 106a, 106b. The second ball bearing screw 112 is capable of turning on its axis.

The first ball bearing screw 110 and the second ball bearing screw 112 are screwed through a slider 114 to which tools, works, etc. (not shown) can be attached. The slider 114 is capable of moving on the first ball bearing screw 110 and the second ball bearing screw 112 in the X- and Y-directions when the ball bearing screws 110, 112 turn on their axes.

A first servo motor 116 is fixed on the second traveller 108a. The first ball bearing screw 110 is turned on its axis by the first motor 116.

A second servo motor 118 is fixed on the first traveller 106a. The second ball bearing screw 112 is turned on its axis by the second motor 118.

First timing belts 120a, 120b are provided in parallel to the second linear guides 104a, 104b. The timing belts 120a, 120b are respectively engaged with first timing pulleys 122a, 122b and first timing pulleys 122c, 122d. The second travellers 108a, 108b are respectively connected to the first timing belts 120a, 120b by connecting means 124.

The timing pulleys 122a, 122b, 122c, 122d are rotatably provided on the base 100. The positions of the timing pulleys 122a, 122b, 122c, 122d correspond to each turning end, in the Y-direction, of the timing belts 120a, 120b.

The first timing belts 120a, 120b, the timing pulleys 122a, 122b, 122c, 122d, etc. constitute first restraining means. By the first restraining means, even if the first ball bearing screw 110 is about to incline with respect to the X-axis when the second traveller 108b moves later than the second traveller 108a, the delay of the second traveller 108b is compulsorily eliminated by the tension in the first timing belts 120a, 120b. Thus, positioning error of the slider 114 with respect to the X-direction, vibration during high speed operation, etc., which are caused by the inclination of the first ball bearing screw 110, can be prevented.

Note that, the timing pulleys 122b, 122d is connected by a shaft 123, and the shaft 123 is loosely pierced through the first traveller 106b.

Second timing belts 126a, 126b are provided in parallel to the first linear guides 102a, 102b. The timing belts 126a, 126b are respectively engaged with second timing pulleys 128a, 128b and second timing pulleys 128c, 128d. The first travellers 106a, 106b are respectively connected to the second timing belts 126a, 126b by connecting means 124.

The timing pulleys 128a, 128b, 128c, 128d are rotatably provided on the base 100. The positions of the timing pulleys 128a, 128b, 128c, 128d correspond to each turning end, in the Y-direction, of the second timing belts 126a, 126b.

The second timing belts 126a, 126b, the timing pulleys 128a, 128b, 128c, 128d, etc. constitute second restraining means. By the second restraining means, even if the second ball bearing screw 112 is about to incline with respect to the Y-axis when the first traveller 106b moves later than the first traveller 106a, the delay of the first traveller 106b is compulsorily eliminated by the tension in the second timing belts 126a, 126b. Thus, positioning error of the slider 114 with respect to the Y-direction, vibration during high speed operation, etc., which are caused by the inclination of the second ball bearing screw 112, can be prevented.

Note that, the timing pulleys 128b, 128d are connected by a shaft 129, and the shaft 129 is loosely pierced through the second traveller 108b.

In the Second Embodiment, timing belts and timing pulleys are used as the first restraining means and the second restraining means. Chains and sprockets may be also used as the first restraining means and the second restraining means.

In the First and the Second embodiment, the first and the second restraining means prevent the inclination of the first and the second ball bearing screws with respect to the X-axis and the Y-axis, so that the directions of the first and the second ball bearing screws can be always held in the X-axis and the Y-axis. Thus, positioning accuracy, in the X-Y directions, of the slider can be improved.

Additionally, by preventing the inclination of the first and the second ball bearing screws, vibration, noise, etc. of the slider, which are occurred in high speed operation, can be prevented.

The present invention is not limited to the above stated embodiments, and modifications can be allowed without deviating from the scope of the invention.

What is claimed is:

1. A two dimensional drive system, comprising:
a pair of first linear guides provided in a first direction;
a pair of second linear guides provided in a second direction perpendicular to the first direction;
a pair of first travellers respectively engaged with said first linear guides, said first travellers being capable of moving in the first direction along said first linear guides;
a pair of second travellers respectively engaged with said second linear guides, said second travellers being capable of moving in the second direction along said second linear guides;
a first ball bearing screw being provided in the first direction, said first ball bearing screw rotatably extending between said second travellers;
a second ball bearing screw being provided in the second direction, said second ball bearing screw rotatably extending between said first travellers;
a slider being screwed with said first ball bearing screw and said second ball bearing screw, said slider being capable of moving in the first direction and the second direction on said first ball bearing screw and said second ball bearing screw with rotation thereof;
a first motor for driving said first ball bearing screw, said first motor being provided on one of said second travellers;
a second motor for driving said second ball bearing screw, said second motor being provided on one of said first travellers;
first restraining means for restraining the inclination of said first ball bearing screw with respect to the first direction; and
second restraining means for restraining the inclination of said second ball bearing screw with respect to the second direction;
said first restraining means comprises:
a pair of first racks being respectively provided in parallel to each of said second linear guides;
a first shaft being provided in the first direction, said first shaft rotatably projecting through said second travellers; and
a pair of first pinions being respectively fixed at each end of said first shaft, said first pinions respectively engaging with each of said first racks, and
said second restraining means comprises:
a pair of second racks being respectively provided in parallel to each of said first linear guides;
a second shaft being provided in the second direction, said second shaft rotatably projecting through said first travellers; and
a pair of second pinions being respectively fixed at each end of said second shaft, said second pinions respectively engaging with each of said second racks.

2. The two dimensional drive system according to claim 1 wherein,
said first shaft and said second shaft are pierced through said slider.

3. The two dimensional drive system according to claim 1 wherein,
said first shaft projects through a first pipe, extending between said second travellers, and
said second shaft is pierced through a second pipe, extending between said first travellers.

4. The two dimensional drive system according to claim 3 wherein,
said first pipe and said second pipe are filled with lubricant.

5. The two dimensional drive system according to claim 3 wherein,
said slider is capable of moving on said first pipe and said second pipe.

6. The two dimensional drive system according to claim 5 wherein,
said first pipe and said second pipe are filled with lubricant.

7. A two dimensional drive system, comprising:

a pair of first linear guides provided in a first direction;

a pair of second linear guides provided in a second direction perpendicular to the first direction;

a pair of first travellers respectively engaged with said first linear guides, said first travellers being capable of moving in the first direction along said first linear guides;

a pair of second travellers respectively engaged with said second linear guides, said second travellers being capable of moving in the second direction along said second linear guides;

a first ball bearing screw being provided in the first direction, said first ball bearing screw rotatably extending between said second travellers;

a second ball bearing screw being provided in the second direction, said second ball bearing screw rotatably extending between said first travellers;

a slider being screwed with said first ball bearing screw and said second ball bearing screw, said slider being capable of moving in the first direction and the second direction on said first ball bearing screw and said second ball bearing screw with rotation thereof;

a first motor for driving said first ball bearing screw, said first motor being provided on one of said second travellers;

a second motor for driving said second ball bearing screw, said second motor being provided on one of said first travellers;

first restraining means for restraining the inclination of said first ball bearing screw with respect to the first direction; and second restraining means for restraining the inclination of said second ball bearing screw with respect to the second direction;

said first restraining means comprises:

a pair of first timing belts respectively provided in parallel to each of said second linear guides, wherein said second travellers are respectively connected to each of said first timing belts; and two pairs of first pulleys engaging with said first timing belts, wherein each pair of said first pulleys respectively engage with a turning end of each of said first timing belts, and said second restraining means comprises:

a pair of second timing belts respectively provided in parallel to each of said first linear guides, wherein said first travellers are respectively connected to each of said second timing belts; and two pairs of second pulleys engaging with said second timing belts, wherein each pair of said second pulleys respectively engage with a turning end of each of said second timing belts.

* * * * *